UNITED STATES PATENT OFFICE.

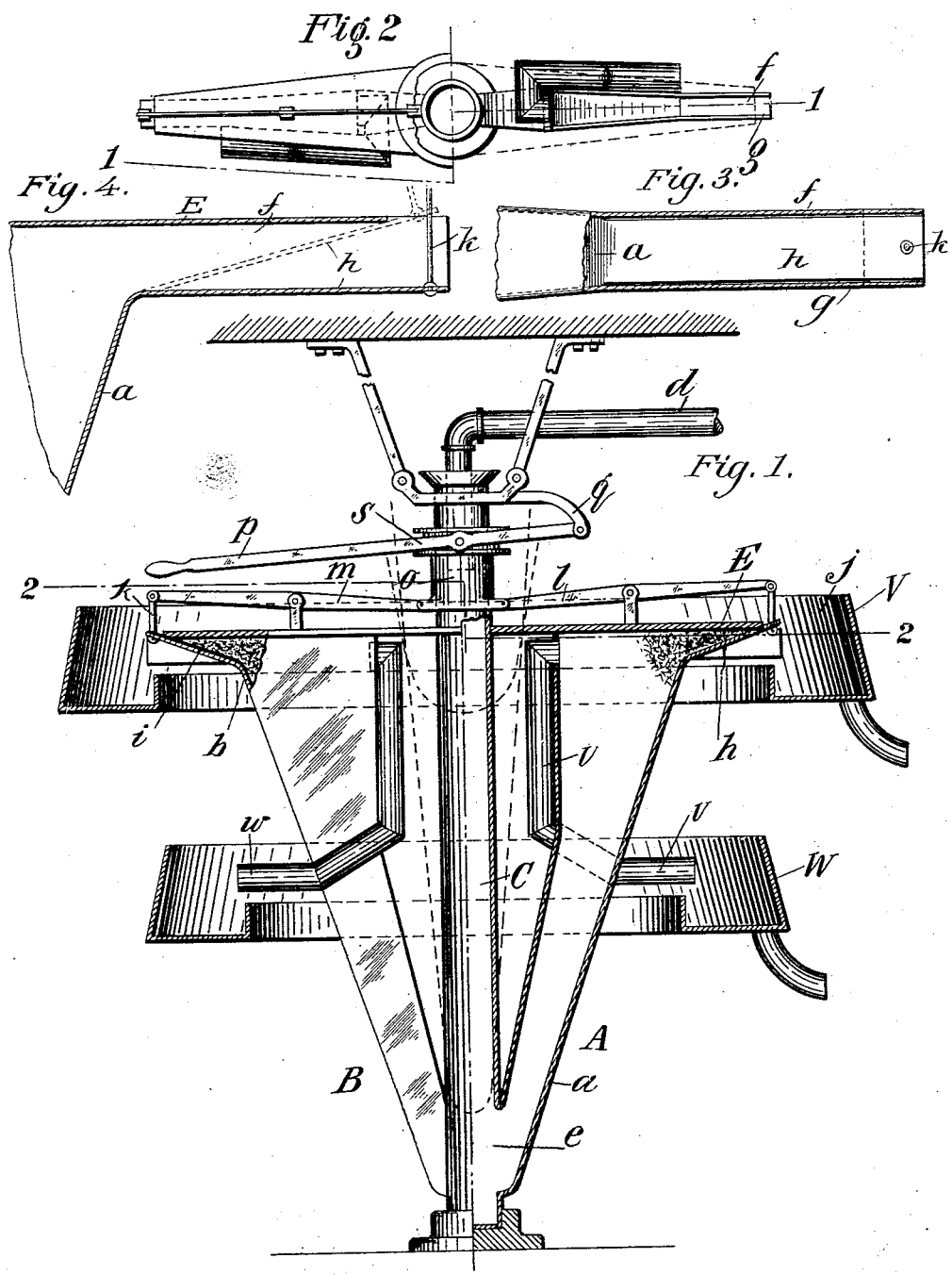

HAROLD DE RAASLOFF, OF NEW YORK, N. Y.

PROCESS OF CLARIFYING LIQUIDS.

SPECIFICATION forming part of Letters Patent No. 685,793, dated November 5, 1901.

Application filed February 5, 1901. Serial No. 46,140. (No specimens.)

*To all whom it may concern:*

Be it known that I, HAROLD DE RAASLOFF, a citizen of the United States of America, and a resident of the borough of Manhattan, in the city of New York and State of New York, have invented certain new and useful Improvements in Processes of Clarifying Liquids, of which the following is a specification.

This invention relates to improvements in processes of clarifying liquids by centrifugal action.

The process effects the removal from a liquid of the most finely divided solid matters, producing a clear solution, which is practically free from solid particles. The result is identical with that which is usually produced by the passage of the liquid through a porous diaphragm or other filtering medium, is much more thorough than and so different in degree as to be different in kind from the separation of suspended solid matters into layers of various degrees of fineness, and is properly and accurately designated by the term "centrifugal clarification."

Essentially the process consists in causing a solution which contains the finely-divided solid matters to flow continuously through a revolving vessel and therein continuously removing the said solid matters from the liquid by centrifugal force without the aid of any filtering diaphragm, cell, or medium. The solid matters removed from the liquid are continuously discharged from the vessel at a point or points relatively distant from the axis of revolution, while the clear liquid is simultaneously and continuously discharged from the vessel at a point or points relatively nearer to said axis of revolution.

The process also includes, as a subsidiary process, the holding back of the solid matters in greater or less degree when the operation is begun until they have formed a mass at the point or points of discharge of the solid matters which is sufficiently compacted to prevent the escape of the liquid from the said point or points of discharge and thereafter allowing said compacted solid matters to escape from the vessel at the same rate as that at which they separate from the liquid, so that once the so-called "plug" or mass of solid matters begins to issue from the vessel it continues to discharge as long as the operation continues at practically the same degree of consistency.

The aforesaid continuous process of centrifugal classification is of great value in various arts, and particularly in the recovery of precious metals by the cyanid processes as a substitute for the filter-beds which are now used, for, as is well known, these filter-beds are not available in the treatment of "slimes," because the very fine clayey particles soon fill up the interstices of beds and stop the filtration, and even in such cases as the beds can be used in they are very slow in action as compared with my centrifugal clarification. My process will result in great saving in first cost of plant and immense increase in output in a given time.

The process can be operated with varied apparatus, and in the accompanying drawings I illustrate only that which I have found preferable, not, however, limiting the process to the details of that apparatus.

Referring to the said drawings, Figure 1 is an elevation and section on the line 1 1 of Fig. 2, showing the compartment on the right with the side removed. Fig. 2 is a plan and section on the line 2 2 of Fig. 1 and showing the said compartment on the right with the top plate cut away. Parts of the mechanism for operating the valves are omitted from this figure. Figs. 3 and 4 are respectively a top view, the cover-plate being broken away, and a sectional elevation of one of the valves.

The parabolas shown by dotted lines in Fig. 1 indicate the theoretical shapes assumed by the surface of the liquid at two different velocities of rotation if the liquid were confined in a vessel having the shape of the outer line of the boxes and rotating at the speed thereof.

The drawings show two compartments A B, fixed on opposite sides of a hollow shaft C; but any number of compartments can be employed, and said compartments should be arranged symmetrically around said shaft C. A pipe *d* from a suitable tank delivers the solution into the top of said shaft C, which is closed at the bottom, and said shaft C communicates, as at *e*, with said compartments A B. Said compartments A B are closed at the top by the plate E and are provided with outwardly-extending plates *f g*, Fig. 2, between which work the valves *h i*, said valves being extensions of the outer walls a b, respectively, of said compartment A B. As the range of movement of the said valves h i is not great, the elasticity of the metal of the walls a b is sufficient to allow for such motion, and it is not necessary to hinge said valves to said sides a b, the metal of the sides being merely bent outward to form said valves, as shown.

Said valves h i have a water-tight fit between the walls f g and are connected by links j k with levers l m, respectively, the inner ends of said levers being connected by pins and slots in the usual manner with a collar o, which is worked on said shaft C by a lever p, which is pivoted to a bracket q at r and has the usual fork or ring s, pivotally connected with said collar o.

Pipes v w for the discharge of the liquid from compartments A B, respectively, are preferably connected with the inner walls of said compartments, near the tops thereof, as shown, and thence lead downward and outward, finally discharging into an annular trough W. The solid matters discharge from the valves h i into the annular troughs V, and said troughs are provided with any suitable draw-off pipes, as indicated. Said pipes v w should be as far inward from the discharge-points of the solid matters as possible, but outside of the parabolas which indicate the surface of the liquid, at least when no pump or similar device is used to draw off the filtered liquid, for if said pipes v w are within—i. e., nearer the axis of rotation than the surface assumed by the liquid when rotated, said liquid will not discharge through said pipes v w.

The process is operated in the following manner: When the solution first enters the vessel, the valves h i will be closed to such a degree as to cause the solid matters which fly to the outer walls of the compartments A B as the compartments revolve to compact sufficiently in the discharge-nozzles formed by the side plates f g, the cover E, and the said valves h i to plug, as it were, said nozzles and prevent the escape of the liquid. When the plugs are formed, said valves will be opened to a degree depending on the character of the solution and the velocity of rotation and so that the plugs can escape at the same rate as they form. The valves are then left open the proper degree, and thereafter the plugs issue continuously from their outlets at practically the same degree of consistency, while the clear liquid will be discharged continuously from pipes v w.

I have shown the compartments A B provided with outwardly and upwardly sloping walls a b, respectively; but the invention is not limited to any particular inclination or slope of said walls. I also show said compartments in plan as contracting to the discharge-nozzles, Fig. 2, and this is the preferable shape, while the arrangement of the valves h i as described has the advantage of avoiding shoulders, which prevent the free discharge of the solid matters when the valves are partly closed; but the process is not confined to any details of construction either of valves or compartments.

Now, having described my improvements, I claim as my invention—

The process of centrifugal clarification hereinbefore set forth, consisting in causing mixed solid and liquid to flow continuously through a revolving vessel, checking the discharge of the solid matters which separate from the liquid to form a plug which prevents the escape of the liquid from the point where solids discharge, and thereafter allowing the plug to discharge at the rate at which it is formed, and discharging the filtered liquid from said vessel at a point different from the point of discharge of the solids.

Signed at New York city this 29th day of January, 1901.

HAROLD DE RAASLOFF.

Witnesses:
WILMORE ANWAY,
HENRY V. BROWN.